3,054,739
CHLORINATION OF BUTINE-(2)-DIOL-(1,4)
Franz Reicheneder and Karl Dury, Ludwigshafen (Rhine), Germany, assignors to Badische Anilin- & Soda-Fabrik Aktiengesellschaft, Ludwigshafen (Rhine), Germany
No Drawing. Filed Apr. 22, 1960, Ser. No. 23,902
Claims priority, application Germany Apr. 24, 1959
11 Claims. (Cl. 204—158)

This invention relates to a process for the chlorination of butine-(2)-diol-(1,4) for the production of valuable compounds containing chlorine.

Little has been described in the literature concerning the chlorination of butine-diol. It is only quite recently that a process for the chlorination of butine-(2)-diol-(1,4), which is often simply called butine-diol, has been proposed which leads to 2,2,3,3-tetrachlorbutane-diol-(1,4). This compound is also often simply referred to as tetrachlorbutane-diol. The known process consists in allowing gaseous chlorine to act in excess on the alkine diol dissolved in a liquid aromatic hydrocarbon in the presence of acid-binding agents. The yields of chlorination product in this method of operation are unsatisfactory. Moreover, chlorination of the aromatic compounds cannot be avoided when working in this way.

The chlorination of butine-diol has also been carried out by first converting it into a 1,4-diacyloxy-butine-(2), then reacting this with chlorine to the corresponding 1,4-diacyloxy-2,2,3,3-tetrachlorbutane and splitting the latter compound by hydrolysis to 2,2,3,3-tetrachlor-butane-diol-(1,4). This method is troublesome and has the disadvantage that prior to chlorination the butine-diol must first be converted into an ester and later the chlorinated ester must be split up again.

There is no suggestion in the prior art that it might be possible to recover other valuable chlorine-containing reaction products (such as 2,3-dichlor-maleic-aldehyde acid, which is also known under the names 2,3-dichlorbutene-(2)-al-(4) acid or mucochloric acid, further tetrachlorbutyro-lactone and 2,3-dichlormaleic acid) besides tetrachlor-butane-diol. There is also no indication in the prior art as to how to modify the reaction conditions of the chlorination of butine-diol in order to obtain a reaction product other than tetrachlorbutane-diol, e.g., mucochloric acid, in a predominant amount.

It is an object of the present invention to provide a process for the chlorination of butine-diol which is simple and easy to carry out in industry and which gives satisfactory yields of valuable compounds containing chlorine. Another object is to provide a process for the chlorination of butine-diol in which no aromatic or other organic solvent is needed. Still another object of the invention is to provide new conditions under which butine-diol can be directly chlorinated without it being necessary first to convert it into derivatives, as for example, acyl compounds. A further object of the invention is to obtain a direct chlorination of butine-diol into valuable chlorination products, especially mucochloric acid and tetrachlorbutane-diol, under such variable reaction conditions that one of the two compounds can be preferentially produced as the main product.

According to this invention the said objects are achieved by reacting butine-diol with at least two mols of chlorine per mol of butine-diol in an aqueous solution of a mineral acid which is not oxidized by chlorine under the conditions of the process, the reaction being carried out at a temperature between 0 and 150° C. By the new process butine-diol is converted into valuable chlorinated compounds. Among these compounds tetrachlorbutane-diol and mucochloric acid are especially valuable products. Other chlorinated derivatives of butine-diol obtainable according to the invention are 2,2,3-tetrachlorbutyrolactone and 2,3-dichlormaleic acid. By appropriate choice of the reaction conditions, one or another product can be produced in a predominant amount, as set forth further below.

The process according to the invention should be carried out in the presence of an aqueous solution of a mineral acid. Since chlorine and water form hydrochloric acid, according to the equation:

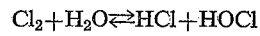

$$Cl_2 + H_2O \rightleftharpoons HCl + HOCl$$

it is possible to carry out the process by reacting chlorine and butine-diol in the presence of water without adding an acid. It is, however, more advantageous to start with an aqueous solution of a strong mineral acid rather than with water. The preferred mineral acids include: hydrochloric acid, sulfuric acid, nitric acid, and phosphoric acid. The best results are achieved if they are applied in a concentration between 2 and 36% by weight with reference to the total amount of acid and water. It is possible to work with an acid solution of an even higher concentration, such as 40% sulfuric acid. Sulfuric acid is preferably used in a concentration between 2 and 30% by weight if tetrachlorbutane-diol or mucochloric acid are intended to be obtained as main products. The preferred acids are hydrochloric acid and sulfuric acid in a concentration of between 2 and 40% by weight, advantageously between 2 and 36% by weight, more specifically 5 to 30% by weight.

The preferred temperature range for the reaction is 0° to 120° C., especially 20° to 110° C. By the choice of the temperature it is possible to shift the reaction either toward the production of tetrachlorbutane-diol or toward the formation of mucochloric acid. Temperatures higher than about 60° C., for example, temperatures between about 60° and 150° C., especially between 60° and 120° C., promote the reaction in the direction of higher yields of mucochloric acid, whereas at relatively low working temperatures, as for example about 0° to 50° C., advantageously 30° to 50° C., 2,2,3,3,-tetrachlorbutane-diol-(1,4) is formed as the main product.

The process is carried out as a rule at atmospheric pressure. It is also possible, however, to work at increased or slightly reduced pressure, for example, in the pressure range of about 0.5 to 50 atmospheres.

The chlorination may be accelerated by the co-employment of catalysts. Suitable reaction-promoting agents include light of which the wave length amounts to about 250 to 700 millimicrons and radical-forming substances, such as hydrogen peroxide or benzoyl peroxide.

The following also have the effect of promoting the reaction: alkali or alkaline earth salts, for example the chlorides, chlorates, sulfates, nitrates or nitrites of sodium, potassium, lithium, ammonium, magnesium, calcium, strontium or barium; and heavy metal compounds, as for example iron, zinc, mercury, nickel, lead or bismuth in oxidic form or combined as salts, for example as salts of inorganic or organic acids, or compounds which form enolates. As representatives of preferred heavy metal compounds there may be specified for example zinc chloride, mercury chloride, iron(II) sulfate, iron(III) chloride, vanadium pentoxide and nickel acetylacetonate. It is sufficient to add these catalysts in small amounts, for example in amounts between 0.1 and 2% by weight with reference to the amount of butine-diol to be reacted.

The reaction according to the invention is generally speaking carried out by contacting chlorine with butine-diol in an aqueous medium. The process may be carried out either continuously or batchwise. For example, chlorine gas may be passed into an aqueous medium or into an aqueous mineral acid solution of butine-diol, the reaction mixture being maintained at the desired temperature by heating or cooling. In this and in all other embodiments of the invention it is advantageous to use more than the minimum amount of chlorine required for the addition of two mols of chlorine to one mol of butine-diol and to supply the chlorine in gaseous form. The preferred molar ratio of butine-diol to chlorine lies between 1 to 3 and 1 to 20. The chlorine may be introduced into the solution either in batches or continuously. It should be further stated that in any method of working the use of an aqueous mineral acid solution of butine-diol is more advantageous to start with than water free of acids. It is preferable to work by introducing into the aqueous butine-diol solution gaseous hydrogen chloride, concentrated aqueous hydrochloric acid or another mineral acid, for example, 60 to 98% sulfuric acid or phosphoric acid. It is preferable to work with aqueous butine-diol solutions of which the content of butine-diol is about 5 to 50% by weight, advantageously about 20 to 40% by weight with reference to the total mixture. The preferred butine-diol solution has a content of mineral acid of about 2 to 40% by weight, preferably 10 to 36% by weight with reference to the total amount of acid and water present in the solution. For the preparation of this solution, it is not necessary to start from anhydrous butine-diol but rather there may be directly used technical aqueous butine-diol solutions such as are obtained by the reaction of aqueous formaldehyde with acetylene in the butine-diol synthesis according to W. Reppe. Such solutions contain as a rule, about 25 to 35% by weight of butine-diol.

It has proved to be advantageous to preheat the aqueous mineral acid solution of butine-diol before it is reacted with chlorine. Suitable temperatures for such preheating lie, for example, between 50° and 60° C. The preheating may, for example, be performed for a quarter of an hour up to two hours.

In another procedure according to the invention, chlorine and butine-diol, either by itself or in an aqueous mineral acid solution are simultaneously led into water or an aqueous mineral acid. The conditions with reference to the ratio of chlorine to butine-diol, the acid content of the butine-diol solution and the preheating of the said solution are the same as in the first-mentioned procedure. The addition of both the butine-diol solution and the chlorine may also be carried out batchwise or continuously. The acid content of the aqueous mineral acid solution into which chlorine and the butine-diol solution are simultaneously led lies preferably between 2 and 40% by weight as set forth above.

In another method of performing the process according to the invention, chlorine is first introduced into the preheated aqueous mineral acid solution before the addition of butine-diol.

In an especially favorable process yielding mucochloric acid as the main product, chlorine and an aqueous solution of butine-diol are simultaneously introduced into a mineral acid solution at a temperature between 60 and 120° C. A quantity of water corresponding to that brought into the mixture by the aqueous butine-diol solution is distilled off, either continuously or batchwise after some hours of reaction, e.g., in intervals of 5 to 10 hours. Cooling of the reaction mixture yields a deposited product consisting predominantly of mucochloric acid. This product is separated and the mother liquor is used in place of the above-mentioned mineral acid solution for a further chlorination reaction. It is advantageous to use sulfuric acid in a concentration of 2 to 30% by weight with reference to the total amount of acid and water in this variation of the process.

The process may be readily made continuous. It is possible to work in cocurrent or countercurrent and by the sump or trickling method, i.e. with the liquid in coherent or dispersed form.

The products of the process may be separated in a simple way from the reaction mixture. For example, the separation may be effected, after strong cooling of the reaction mixture and possibly after previous concentration, by crystallization and filtration or centrifuging of the deposited crystals. As a rule the crystals consist of a mixture of mucochloric acid and tetrachlorobutane-diol. The separation of the mixture may be carried out by the usual methods, either by fractional crystallization, for example from aqueous solution, or by way of the salts of mucochloric acid, preferably the alkali salts, for example by dissolving out the mucochloric acid from the crystal mixture with aqueous bicarbonate solution and precipitating the mucochloric acid again from the separated solution by adding mineral acids, such as hydrochloric acid, sulfuric acid or phosphoric acid. Another method of separation comprises esterifying the separated crystalline mixture of the chlorination products by usual methods, for example with alkanols having 1 to 4 carbon atoms, and fractionally distilling the esterification mixture.

The mixtures obtained which substantially consist of 2,2,3,3-tetrachlorobutane-diol-(1,4) and mucochloric acid, and also the individual compounds obtained by separating the mixtures, may be used as nematocides, insecticides, repellants or for the flame-proofing of plastics.

The following examples will further illustrate this invention but the invention is not restrict to these examples.

*Example 1*

2 liters of concentrated, about 36%, hydrochloric acid are charged into a glass tube 180 cm. long and 7 cm. in diameter which is surrounded by a heating jacket and provided at the bottom with a frit through which gas may be introduced. After the acid has been heated up to about 83° C. by means of steam led through the heating jacket, a stream of chlorine of about 50 liters per hour is led in through the glass frit. At the same time about 30 grams per hour of butine-(2)-diol-(1,4) dissolved in 50 grams of water are introduced into the hydrochloric acid solution. The mixture being chlorinated is irradiated with a fluorescent lamp of the type Osram No. 1015. After a total of 157 grams of butine-diol have been added, the introduction is discontinued and chlorine is led in at the same hourly amount for about another hour while continuing the irradiation.

The chlorination mixture is then concentrated to a total volume of about 400 ccs. in a circulatory vaporizer at about 50° C. and 20 mm. Hg. After the concentration, the mixture is cooled to 0° C. and allowed to stand for about 5 hours at this temperature. By filtration there are obtained 220 grams of crystalline product which melts at 90° to 100° C. Titration with N/10 methanolic caustic potash gives a content of 71% of mucochloric acid. The remainder is 2,2,3,3-tetrachlorbutane-diol-(1,4).

*Example 2*

A chlorination apparatus is used which comprises a glass tube 100 cm. long and 7.5 cm. in diameter in the interior of which there is secured a circulation tube of quartz, open at both ends, which is 80 cm. long and 6 cm. in internal diameter. An ultraviolet quartz lamp projects downward into the circulation tube into about the lower third and at the bottom there is provided a frit for the introduction of chlorine. The glass tube is surrounded by a heating jacket in which there flows glycol at a temperature of about 70° to 80° C. 1,400 grams of about 36% hydrochloric acid are charged into the glass tube, the ultraviolet lamp is switched on and 50 liters per hour of chlorine are led in through the glass frit. At the same time a solution of 75 grams of butine-(2)-dinol-(1,4) in 150 grams of water is allowed to flow down into the hydrochloric acid solution at such a rate that the introduction of the total amount of aqueous butine-diol solution requires 3 hours.

The working up of the chlorination mixture takes place as described in Example 1. 105 grams of a crystal mixture which melts at about 100° C. are obtained. The crystal mixture is stirred with a suspension of 40 grams of sodium bicarbonate in 200 ccs. of water and filtered by suction. The filtrate is acidified with concentrated hydrochloric acid. 62 parts of mucochloric acid are obtained and are filtered off. Extraction of the acidified solution with ether yields another 6 parts of mucochloric acid.

The bicarbonate-alkaline filter residue is washed with dilute hydrochloric acid and then recrystallized from about 300 ccs. of water, 35 grams of 2,2,3,3-tetrachlorbutane-diol-(1,4) being obtained.

*Example 3*

The chlorinated apparatus described in Example 2 is used without the ultraviolet lamp. 1,400 grams of 36% by weight hydrochloric acid are charged into the glass tube and heated to about 75° C. A solution of 75 grams of butine-(2)-diol-(1,4) in 150 grams of 36% by weight hydrochloric acid is allowed to flow in within 3½ hours, and 175 liters of chlorine are led in during the course of the said time.

After a working up of the chlorination mixture as described in detail in Example 1 there are obtained 92 grams of a crystal mixture which is further separated into its components in the way described in Example 2. 57 grams of mucochloric acid of the melting point 126.5° C. and 31 grams of 2,2,3,3-tetrachlorbutane-diol-(1,4) of the melting point 256° C. are obtained.

*Example 4*

1,400 grams of about 36% by weight hydrochloric acid are charged into the chlorination apparatus described in Example 2. The acid is heated to 75° C. and 50 liters of chlorine are led in per hour. At the same time a solution of 25 grams of butine-diol in 170 grams of 36% by weight hydrochloric acid saturated with sodium chloride is allowed to flow in per hour. After 3 hours, the supply of the butine-diol solution is discontinued and chlorine is led in for another 1½ hours. After concentration of the reaction mixture to about 250 ccs. and cooling of the solution to about 0° C., 107 grams of a crystallizate with 60% by weight of mucochloric acid are obtained.

By working in the same way under the same conditions but while adding 100 grams of zinc chloride to the butine-diol solution instead of sodium chloride prior to the introduction, there are obtained after working up 105 grams of crystallizate with the same content (60%) of mucochloric acid.

*Example 5*

2,400 grams of about 36% by weight hydrochloric acid are charged into the chlorination apparatus described in Example 1. The acid is heated to 72° C. and 50 liters of chlorine are led in per hour. At the same time 500 ccs. of a 30% aqueous butine-diol solution are led in the course of 3 hours. The butine-diol solution is obtained by the butine-diol synthesis of W. Reppe. After a total of 5½ hours, the stream of chlorine is discontinued and the reaction mixture worked up as described in Example 1. 250 grams of a crystallizate are obtained. Titration with N/10 methanolic caustic potash gives a content of 58.5% of mucochloric acid. The remainder consists of 2,2,3,3-tetrachlorobutane-diol-(1,4).

*Example 6*

The procedure of Example 5 is followed with the difference that the chlorination is carried out at a temperature of 93° C. After the usual working up there are obtained 205 grams of crystallizate which contains 73.7% of mucochloric acid (ascertained by titration with methanolic caustic potash).

*Example 7*

The procedure of Example 5 is followed but a chlorination temperature of 20° to 22° C. is used. After working up there are obtained 185 grams of a crystallizate with a content of 19.1% of mucochloric acid and 80.9% of tetrachlorobutane-diol.

*Example 8*

The procedure of Example 5 is followed but 150 grams of butine-diol in 300 ccs. of 30% hydrogen peroxide are used as feed and chlorination is effected at a temperature of 73° C. 200 grams of a white crystallizate with 65% of mucochloric acid are obtained.

*Example 9*

The procedure of Example 2 is followed but a solution of 75 grams of butine-diol in 150 ccs. of 3% hydrogen peroxide is allowed to flow in and chlorination is effected at a temperature of 65° C. Working up of the chlorination mixture gives 107 parts of a white crystallizate with a content of 57.1% of mucochloric acid.

*Example 10*

The chlorination apparatus described in Example 1 is used. 4 liters of water are charged into the apparatus and heated to 80° to 82° C. A solution of 900 grams of butine-diol-(1,4) in 1,500 ccs. of water is allowed to flow in within 20 hours and a stream of chlorine of 100 liters per hour is led through the mixture.

After working up the reaction mixture as described in Example 1 there are obtained 700 grams of a crystal mixture consisting of equal amounts (350 grams each) of mucochloric acid and tetrachlorbutane-diol. The mixture is separated in the way described in Example 2.

*Example 11*

5 liters of water are charged into the apparatus described in Example 1. The water is heated to 85° to 90° C. and a solution of 900 grams of butine-diol in 1,500 grams of water is allowed to flow slowly into the apparatus in the course of 22 hours while at the same time a stream of chlorine of 100 liters per hour is led in. After introducing about 700 to 800 grams of the aqueous butine-diol solution, a corresponding amount of liquid is withdrawn from the top of the apparatus. The working up of the whole reaction mixture takes place as described in Example 1. 700 grams of a crystallized mixture are obtained from which, by separating the mixture into its components as described in Example 2, 400 grams of mucochloric acid and 300 grams of tetrachlorbutane-diol are obtained. During working up there are also obtained 300 grams of a non-crystallizing oil containing much halogen.

*Example 12*

5,000 grams of 10% hydrochloric acid solution are charged into the chlorination apparatus described in Example 1. The acid is heated to 80° to 85° C. and 100 liters of chlorine are led in per hour. At the same time a total of 1,200 grams of butine-diol dissolved in 2,000 grams of water is allowed to flow slowly but continuously into the acid. After reaching a liquid level in the apparatus which corresponds to about 6 liters of liquid, liquid is withdrawn from time to time during the further addition of butine-diol solution so that the said level is not substantially exceeded. Working up the whole reaction mixture gives 1,010 grams of a crystalline mixture of mucochloric acid and tetrachlorbutane-diol. Separation is effected as in Example 2. 490 grams of mucochloric acid and 500 grams of 2,2,3,3-tetrachlorbutane-diol (1,4) are obtained.

*Example 13*

2,000 grams of 36% aqueous hydrochloric acid are charged into a pressure-tight apparatus of commercial glass of 3 liters capacity. The acid is heated to 110° C. and chlorine forced in during the heating up until in the apparatus there prevails a pressure of 1.5 atmospheres gage. After reaching the temperature of 110° C., 100 grams of butine-diol dissolved in 100 ccs. of water are pumped in in the course of an hour. The temperature is slowly raised to 120° C. During the reaction, 100 liters of waste gas are released per hour from the apparatus. After a chlorination period of about 6 hours, the vessel is allowed to cool and the reaction mixture is worked up as described in Example 1. 52 grams of pure mucochloric acid and about the same amount of a non-crystallizing oil which according to infra-red analysis contains about 50% by weight of mucochloric acid are obtained.

*Example 14*

1,600 grams of 10% aqueous hydrochloric acid are charged into the pressure apparatus of commercial glass described in Example 13 and the acid is heated to 110° C. Chlorine is then led into the apparatus so that the pressure in the apparatus remains constant at 1 atmosphere gage. 200 liters of waste gas are released per hour at the same time. 200 grams of a 50% by weight aqueous butine-diol solution are pumped into the hydrochloric acid within an hour. The chlorination is then continued for another 4 hours at the same temperature. After the usual working up of the reaction mixture there are obtained 50 grams of a crystalline chlorination product which contains about 10 grams of 2,2,3,3-tetrachlor-butane-diol-(1,4). The remainder consists of mucochloric acid.

*Example 15*

Into the pressure apparatus of commercial glass described in the preceding example there are charged 1,250 grams of 2% aqueous hydrochloric acid and 200 grams of 50% aqueous butine-diol solution. The mixture is heated to 108° C. Chlorine gas is led into the apparatus in an amount of 175 liters per hour. The pressure in the apparatus is adjusted to 1 atmosphere gage. The total duration of the chlorination amounts to 5 hours. After the usual working up there are obtained 20 grams of almost pure mucochloric acid as well as 120 grams of an oil which according to infra-red analysis contains about 50% of mucochloric acid.

*Example 16*

5,000 ccs. of 2% aqueous sulfuric acid are charged into the apparatus described in Example 1 and heated up to 68° C. 500 grams of butine-diol dissolved in 500 ccs. of 2% aqueous sulfuric acid are allowed to flow into the said amount of acid during the course of 5 hours and at the same time 175 liters of chlorine are led into the mixture. The temperature is slowly raised to 85° C. 420 grams of a non-crystallizing oil separate in the reaction mixture. For working up, the oil is separated from the aqueous sulfuric acid solution and the aqueous phase is concentrated to half its volume. The concentrated solution is extracted with ether. From the ethereal extract, after drying and evaporating the ether, there are obtained 400 grams of crystallized mucochloric acid.

*Example 17*

5,000 ccs. of 10% aqueous sulfuric acid are charged into the apparatus described in Example 1 and heated to 85° C. Then during 4½ hours there is added to the acid a solution of 500 grams of butine-diol in 500 ccs, of 10% aqueous sulfuric acid, while at the same time 175 liters of chlorine per hour are led through the reaction mixture. After working up the reaction mixture as described in Example 16, 750 grams of mucochloric acid and 100 grams of oil which according to infra-red analysis contains about 40% of mucochloric acid are obtained.

*Example 18*

5,000 ccs. of 10% aqueous sulfuric acid are charged into the apparatus described in Example 1 and heated to about 80° C. Then during 8 hours there are allowed to flow into the said acid 100 grams of butine-diol dissolved in 1,200 ccs. of 10% sulfuric acid and at the same time 175 liters per hour of chlorine are led through the reaction mixture. After 8 hours, the reaction vessel is emptied and 2,000 ccs. of the reaction mixture are worked up by precipitating the sulfate ions with barium chloride. After separating the barium sulfate, the aqueous hydrochloric acid filtrate is concentrated until it crystallizes. 20 grams of 2,2,3,3-tetrachlorbutane-diol-(1,4) and 65 grams of mucochloric acid are obtained. Separation is effected in the way described in Example 2.

The remaining amount of aqueous sulfuric acid reaction mixture is again heated up to 80° to 85° C. in the same apparatus. 175 liters per hours of chlorine are led in and during the course of 3 hours 300 grams of butine-diol in 400 ccs. of 10% aqueous sulfuric acid are allowed to flow in. After 3 hours, the reaction mixture is allowed to cool. The crystals which separate by spontaneous crystallization upon cooling are filtered off. 30 grams of pure mucochloric acid are obtained.

The filtrate is returned to the apparatus and again chlorinated in the way described above. The duration of the chlorination is raised to 5 hours. After repeating the chlorination six times, so that in all 3,700 grams of butine-diol in 4,000 ccs. of 10% sulfuric acid have been supplied, there are obtained from the total amount of butine diol supplied, 2,600 grams of mucolochloric acid and 5,330 grams of oil which according to infra-red analysis still contains 50% of mucochloric acid.

*Example 19*

The apparatus described in Example 1 is provided at the upper end with a descending condenser provided with a receiver. 5,000 ccs. of a 10% aqueous sulfuric acid are charged into the apparatus and the acid then heated to 100° to 110° C. Within 7 hours, 2,000 grams of aqueous 30% butine-diol solution are allowed to flow into the said sulfuric acid. During the addition, 175 liters of chlorine per hour are led in at the same time. By varying the temperature within the above-mentioned range of 100° to 110° C., there is distilled off and subsequently condensed in the descending condenser as much water as there was contained in the butine-diol solution added during the course of 5 hours. Then the same amounts of butine-diol and chlorine are reacted by introducing the same into the concentrated solution. After the second reaction period the first mucochloric acid is deposited after cooling and removed by filtration. The filtrate is replaced in the reaction vessel and chlorine and butine-diol are reacted within 5 hours under the conditions set forth above. Mucochloric acid is now deposited and removed from the reaction mixture after each 5-hour-reaction period. After 20 reaction periods the average amount of crystallized mucochloric acid obtained after each reaction period amounts to 750 grams, the melting point being 116° to 118° C. Under these conditions only traces of tetrachlorbutane-diol and oily products are obtained.

The same results are obtained if the reaction mixture is concentrated by distilling off water while the aqueous butine-diol solution is being added.

*Example 20*

The apparatus described in Example 2 is used but without the inner circulation tube. 1,000 grams of 2% aqueous nitric acid are charged into the apparatus and the acid is heated to 100° C. At the same time a stream of chlorine of 60 liters per hour is led in. Within 4 hours a solution of 120 grams of butine-diol in 240 ccs. of water is allowed to flow in. After the amount of butine-diol has been introduced, the reaction mixture is allowed to cool and the mixture extracted with ether. From the ether extract, after evaporating the ether, there are obtained 120 grams of a syrupy residue which according to infra-red analysis contains 50 grams of mucochloric acid.

Example 21

The procedure of Example 20 is followed but with a 40% aqueous nitric acid at a temperature of 0° C., it being necessary to cool temporarily. From 200 grams of butine-diol in 200 ccs. of water added within 4 hours, there are obtained by subsequent dilution of the reaction solution with the same volume of water, 15 grams of tetrachlorbutyrolactone (melting point 190° C.). 1 liter of the reaction solution (which amounts in all to about 3 liters) is extracted with ethyl acetate. From the ethyl acetate extract there are obtained, after drying and evaporating the ester, 50 grams of an oil which according to infra-red analysis contains about 10% by weight of mucochloric acid. The remaining 2 liters of the aqueous reaction solution are concentrated to about 200 ccs. having a syrupy consistency in a circulatory vaporizer. Spontaneous crystallization of the syrup yields about 15 grams of crystallized dichloromaleic acid.

Example 22

The procedure of Example 20 is followed but with 10% aqueous phosphoric acid, instead of nitric acid, at a temperature of 95° to 100° C. and an amount of chlorine of 60 liters per hour. From 120 grams of butine-diol, by concentration of the aqueous phosphoric acid reaction solution to about half the volume and by exhaustive extraction with ethyl acetate, there are obtained about 100 grams of an oil which according to infra-red analysis contains 40% by weight of mucochloric acid.

Example 23

3,000 ccs. of 10% aqueous sulfuric acid are charged into the apparatus described in Example 1 and the acid is heated to 80° to 85° C. The pressure in the apparatus is kept at 500 mm. Hg by means of a vacuum pump. 500 ccs. of a 50% aqueous butine-diol solution are allowed to flow into the said sulfuric acid and at the same time a stream of chlorine of 150 liters per hour is lead in. After 5 hours, the reaction mixture is cooled, the reaction solution concentrated to about half and the deposited crystals are filtered off. 300 grams of a mixture of mucochloric acid and tetrachlorbutane-diol are thus obtained. 60% of the mixture consist of mucochloric acid and 40% of 2,2,3,3-tetrachlorbutane-diol-(1,4).

Example 24

A chlorination apparatus is used which comprises a glass tube 180 cm. long and 7 cm. in diameter and which is provided at the bottom with a frit through which gas may be introduced. In this apparatus there are charged 2,200 ccs. of about 36% hydrochloric acid and 50 liters per hour of chlorine are led in through the glass frit. At the same time 500 ccs. of a 30% technical aqueous butine-diol solution (obtained by butine-diol synthesis according to W. Reppe) is allowed to flow down into the hydrochloric acid solution at such a rate that the introduction of the total amount of aqueous butine-diol solution requires 5½ hours. The temperature during the chlorination is maintained at 20 to 22° C.

The working up of the chlorination mixture takes place as described in Example 1. 185 grams of a crystal mixture which melts at about 147 to 155° C. are obtained. The mixture consists of 19% of mucochloric acid and 81% of tetrachlorbutane-diol.

What we claim is:

1. A process for the chlorination of butine-(2)-diol-(1,4) which comprises reacting said butine-(2)-diol-(1,4) with at least 2 mols of chlorine per mol of butine-(2)-diol-(1,4) in an aqueous solution of a mineral acid having a maximum acid concentration of about 40% by weight with reference to the total amount of acid and water at a temperature between about 0 and 150° C.

2. A process as claimed in claim 1 wherein the reaction temperature is between about 20° and 50° C.

3. A process as claimed in claim 1 wherein the reaction temperature is between about 60° and 120° C.

4. A process as claimed in claim 1 wherein the concentration of the mineral acid with reference to the total amount of water and acid lies between 2 and 40% by weight.

5. A process as claimed in claim 1 wherein the reaction is carried out under simultaneous irradiation with light of a wave length between 250 and 700 millimicrons.

6. A process as claimed in claim 1 wherein the reaction is carried out in the presence of a catalytical amount of at least one substance selected from the class consisting of hydrogen peroxide, benzoyl peroxide and a metal salt.

7. A process as claimed in claim 1 wherein chlorine and butine-(2)-diol-(1,4) are reacted in water as the solvent, hydrochloric acid being formed in situ by the action of chlorine on water.

8. A process for the chlorination of butine-(2)-diol-(1,4) which comprises reacting said butine-(2)-diol-(1,4) dissolved in a 2 to 36% by weight aqueous solution of hydrochloric acid with 3 to 20 mols of chlorine per mol of butine-(2)-diol-(1,4) at a temperature between 20° and 110° C.

9. A process for the chlorination of butine-(2)-diol-(1,4) which comprises leading chlorine at a temperature between 0 and 150° C. into an aqueous solution of butine-(2)-diol-(1,4) containing a mineral acid selected from the group consisting of sulfuric acid, nitric acid, phosphoric acid and hydrochloric acid, the chlorine being introduced in a molar ratio of at least 2 mols per mol of butine-(2)-diol-(1,4), the content of mineral acid being between 2 and 40% by weight with reference to the total amount of acid and water, and the content of butine-(2)-diol-(1,4) being between 5 and 50% by weight with reference to the total amount of butine-(2)-diol-(1,4), acid and water.

10. A process for the chlorination of butine-(2)-diol-(1,4) which comprises simultaneously leading an aqueous solution of butine-(2)-diol-(1,4) and chlorine in an amount of at least 2 mols of chlorine per mol of butine-(2)-diol-(1,4) at a temperature between 60° and 150° C. into an aqueous solution of a mineral acid having a maximum acid concentration of 40% by weight, distilling off a quantity of water corresponding to that introduced into the mixture by the aqueous solution of butine-(2)-diol-(1,4), cooling the remaining aqueous reaction medium and separating the reaction product therefrom, and re-using the separated mother liquor as said aqueous solution of the mineral acid for further reaction in accordance with the preceding steps.

11. A process as claimed in claim 10 wherein the mineral acid is sulfuric acid in a concentration of 2 to 30% by weight with reference to the total amount of acid and water.

References Cited in the file of this patent

UNITED STATES PATENTS 2,901,516    Wynn _____ Aug. 25, 1959

FOREIGN PATENTS 803,058    Great Britain _____ Oct. 15, 1958

UNITED STATES PATENT OFFICE
CERTIFICATE OF CORRECTION

Patent No. 3,054,739                      September 18, 1962

Franz Reicheneder et al.

It is hereby certified that error appears in the above numbered patent requiring correction and that the said Letters Patent should read as corrected below.

Column 1, line 72, for "2,2,3-" read -- 2,2,3,3- --.

Signed and sealed this 2nd day of April 1963.

(SEAL)
Attest:
ESTON G. JOHNSON

Attesting Officer

DAVID L. LADD

Commissioner of Patents